(12) United States Patent
Regev et al.

(10) Patent No.: US 9,785,527 B2
(45) Date of Patent: Oct. 10, 2017

(54) METHODS, SYSTEMS, AND COMPUTER READABLE MEDIA FOR EMULATING VIRTUALIZATION RESOURCES

(71) Applicant: Ixia, Calabasas, CA (US)

(72) Inventors: Alon Regev, Woodland Hills, CA (US); Deepesh Arora, Thousand Oaks, CA (US); Toshal Dudhwala, West Hills, CA (US); Anirban Majumder, Woodland Hills, CA (US)

(73) Assignee: IXIA, Calabasas, CA (US)

( * ) Notice: Subject to any disclaimer, the term of this patent is extended or adjusted under 35 U.S.C. 154(b) by 144 days.

(21) Appl. No.: 14/224,024

(22) Filed: Mar. 24, 2014

(65) Prior Publication Data

US 2014/0298335 A1 Oct. 2, 2014

Related U.S. Application Data

(60) Provisional application No. 61/805,915, filed on Mar. 27, 2013.

(51) Int. Cl.
| | |
|---|---|
| G06F 9/44 | (2006.01) |
| G06F 9/45 | (2006.01) |
| G06F 9/455 | (2006.01) |
| G06F 11/263 | (2006.01) |
| G06F 9/30 | (2006.01) |
| G06F 11/20 | (2006.01) |
| G06F 11/26 | (2006.01) |
| G06F 9/445 | (2006.01) |
| G06F 11/36 | (2006.01) |

(52) U.S. Cl.
CPC ........ *G06F 11/263* (2013.01); *G06F 9/30076* (2013.01); *G06F 11/203* (2013.01);
(Continued)

(58) Field of Classification Search
CPC ............... G06F 9/45558; G06F 9/5077; G06F 9/45537; G06F 9/45533;
(Continued)

(56) References Cited

U.S. PATENT DOCUMENTS

| | | |
|---|---|---|
| 6,542,854 B2 | 4/2003 | Yang et al. |
| 6,769,054 B1 | 7/2004 | Sahin et al. |

(Continued)

FOREIGN PATENT DOCUMENTS

| | | |
|---|---|---|
| WO | WO 2011/002578 A1 | 1/2011 |
| WO | WO 2015/023369 A1 | 2/2015 |

OTHER PUBLICATIONS

Lorenzo Martignoni et al., Testing System Virtual Machines, 2010, [Retrieved on May 25, 2017]. Retrieved from the internet: <URL: http://s3.amazonaws.com/academia.edu.documents/46669074/Testing_system_virtual_machines20160621-10024-1371z9y.pdf?> 11 Pages (1-11).*

(Continued)

*Primary Examiner* — Thuy Dao
*Assistant Examiner* — Anibal Rivera
(74) *Attorney, Agent, or Firm* — Jenkins, Wilson, Taylor & Hunt, P.A.

(57) ABSTRACT

Methods, systems, and computer readable media for emulating virtualization resources are disclosed. According to one method, the method occurs at a computing platform. The method includes receiving a message associated with a device under test (DUT) and in response to receiving the message, performing an action associated with at least one of an emulated hypervisor and an emulated virtual machine (VM).

20 Claims, 4 Drawing Sheets

(52) U.S. Cl.
CPC ............ *G06F 11/261* (2013.01); *G06F 8/65* (2013.01); *G06F 9/45533* (2013.01); *G06F 9/45537* (2013.01); *G06F 11/3688* (2013.01)

(58) Field of Classification Search
CPC . G06F 2009/45595; G06F 2009/45562; G06F 2009/45579; G06F 2009/45575; G06F 9/455; G06F 9/4856; G06F 9/505; G06F 9/50; G06F 9/45504; G06F 9/44521; G06F 9/45541; G06F 9/5044; G06F 9/4411; G06F 9/5088; G06F 9/30076; G06F 11/203; G06F 11/3688; G06F 11/3664; G06F 11/1451; G06F 11/1484; G06F 11/30; G06F 8/63; G06F 8/65; G06F 8/30; H04L 49/70
See application file for complete search history.

(56) References Cited

U.S. PATENT DOCUMENTS

| | | | |
|---|---|---|---|
| 6,792,393 B1 | 9/2004 | Farel et al. | |
| 7,159,184 B2 | 1/2007 | Ullah et al. | |
| 7,277,395 B2* | 10/2007 | Rosen | H04W 24/00 370/241 |
| 7,328,134 B1 | 2/2008 | Burbidge, III et al. | |
| 7,603,372 B1 | 10/2009 | Honicky, Jr. et al. | |
| 7,730,492 B1* | 6/2010 | Blaukopf | G06F 9/45504 718/1 |
| 7,814,495 B1* | 10/2010 | Lim | G06F 9/45558 717/168 |
| 7,865,908 B2* | 1/2011 | Garg | G06F 9/45537 718/1 |
| 7,890,951 B2 | 2/2011 | Vinberg et al. | |
| 8,068,602 B1* | 11/2011 | Bluman | H04M 3/42221 379/266.1 |
| 8,145,470 B2* | 3/2012 | Green | G06F 9/45504 703/26 |
| 8,286,147 B2* | 10/2012 | Alpern | G06F 9/44521 717/138 |
| 8,694,644 B2* | 4/2014 | Chen | G06F 9/4856 709/226 |
| 8,805,951 B1* | 8/2014 | Faibish | G06F 9/5072 709/213 |
| 8,984,341 B1 | 3/2015 | Chandrasekharapuram et al. | |
| 9,317,252 B2 | 4/2016 | Roy et al. | |
| 9,436,566 B2 | 9/2016 | Panda et al. | |
| 9,507,616 B1 | 11/2016 | Ramanath et al. | |
| 2002/0087282 A1 | 7/2002 | Millard | |
| 2002/0184614 A1 | 12/2002 | Davia et al. | |
| 2003/0036897 A1 | 2/2003 | Flores et al. | |
| 2003/0154432 A1 | 8/2003 | Scott et al. | |
| 2003/0182408 A1 | 9/2003 | Hu | |
| 2004/0010787 A1* | 1/2004 | Traut | G06F 9/4856 718/1 |
| 2004/0015600 A1 | 1/2004 | Tiwary et al. | |
| 2004/0021678 A1 | 2/2004 | Ullah et al. | |
| 2004/0139437 A1 | 7/2004 | Arndt | |
| 2005/0039180 A1* | 2/2005 | Fultheim | G06F 9/45533 718/1 |
| 2005/0116920 A1* | 6/2005 | Park | G09G 3/3413 345/102 |
| 2005/0216234 A1 | 9/2005 | Glas et al. | |
| 2005/0268298 A1* | 12/2005 | Hunt | G06F 9/4856 718/1 |
| 2006/0025985 A1 | 2/2006 | Vinberg et al. | |
| 2006/0037002 A1 | 2/2006 | Vinberg et al. | |
| 2006/0123416 A1* | 6/2006 | Cibrario Bertolotti | G06F 9/45533 718/1 |
| 2007/0067374 A1 | 3/2007 | Iketani et al. | |
| 2007/0069005 A1 | 3/2007 | Dickerson et al. | |
| 2007/0112549 A1 | 5/2007 | Lau et al. | |
| 2007/0283347 A1* | 12/2007 | Bobroff | G06F 8/63 718/1 |
| 2008/0163207 A1* | 7/2008 | Reumann | H04L 63/0263 718/1 |
| 2008/0189700 A1* | 8/2008 | Schmidt | G06F 11/203 718/1 |
| 2008/0208554 A1 | 8/2008 | Igarashi | |
| 2008/0221857 A1 | 9/2008 | Casotto | |
| 2009/0089038 A1 | 4/2009 | Nadgir et al. | |
| 2009/0089781 A1* | 4/2009 | Shingai | G06F 9/5088 718/1 |
| 2009/0119542 A1 | 5/2009 | Nagashima et al. | |
| 2009/0259704 A1 | 10/2009 | Aharoni et al. | |
| 2009/0300613 A1* | 12/2009 | Doi | G06F 9/45537 718/1 |
| 2010/0111494 A1 | 5/2010 | Mazzaferri | |
| 2010/0153529 A1 | 6/2010 | Moser | |
| 2010/0161864 A1 | 6/2010 | Barde et al. | |
| 2010/0169882 A1* | 7/2010 | Ben-Yehuda | G06F 9/45537 718/1 |
| 2010/0235831 A1* | 9/2010 | Dittmer | G06F 9/45558 718/1 |
| 2010/0241734 A1* | 9/2010 | Miyajima | H04L 63/166 709/219 |
| 2010/0250824 A1* | 9/2010 | Belay | G06F 9/45558 711/6 |
| 2010/0299666 A1* | 11/2010 | Agbaria | G06F 9/4856 718/1 |
| 2010/0325191 A1* | 12/2010 | Jung | G06F 15/16 709/202 |
| 2010/0332212 A1* | 12/2010 | Finkelman | G06F 1/3203 703/23 |
| 2011/0010515 A1* | 1/2011 | Ranade | G06F 11/1451 711/162 |
| 2011/0010691 A1* | 1/2011 | Lu | G06F 11/3688 717/124 |
| 2011/0066786 A1* | 3/2011 | Colbert | G06F 9/45558 711/6 |
| 2011/0066819 A1* | 3/2011 | Mashtizadeh | G06F 3/0617 711/162 |
| 2011/0126193 A1* | 5/2011 | Mullin | G06F 8/63 718/1 |
| 2011/0197190 A1* | 8/2011 | Hattori | G06F 9/30076 718/1 |
| 2011/0202917 A1* | 8/2011 | Laor | G06F 8/65 718/1 |
| 2011/0246171 A1* | 10/2011 | Cleeton | G06F 9/45558 703/25 |
| 2011/0307739 A1 | 12/2011 | El Mahdy et al. | |
| 2012/0054409 A1* | 3/2012 | Block | G06F 11/1484 711/6 |
| 2012/0054740 A1* | 3/2012 | Chakraborty | G06F 9/45558 718/1 |
| 2012/0060167 A1* | 3/2012 | Salsburg | G06F 9/50 718/104 |
| 2012/0084487 A1* | 4/2012 | Barde | G06F 9/45541 711/6 |
| 2012/0102492 A1* | 4/2012 | Iwata | G06F 9/45533 718/1 |
| 2012/0110181 A1* | 5/2012 | Tsirkin | G06F 9/4856 709/226 |
| 2012/0131576 A1* | 5/2012 | Hatta | G06F 9/5077 718/1 |
| 2012/0159473 A1* | 6/2012 | Tsirkin | G06F 9/45558 718/1 |
| 2012/0192182 A1* | 7/2012 | Hayward | G06F 9/455 718/1 |
| 2012/0246644 A1* | 9/2012 | Hattori | G06F 9/4411 718/1 |
| 2012/0284709 A1* | 11/2012 | Lorenc | G06F 9/45558 718/1 |
| 2012/0290766 A1* | 11/2012 | Oshins | G06F 9/45537 711/6 |
| 2012/0311387 A1 | 12/2012 | Santhosh et al. | |
| 2013/0013657 A1 | 1/2013 | Emelko et al. | |
| 2013/0019242 A1* | 1/2013 | Chen | H04L 41/145 718/1 |

(56) References Cited

U.S. PATENT DOCUMENTS

| | | | |
|---|---|---|---|
| 2013/0036416 A1* | 2/2013 | Raju | G06F 9/45558 718/1 |
| 2013/0055026 A1 | 2/2013 | Hatano et al. | |
| 2013/0080999 A1* | 3/2013 | Yang | G06F 11/3664 717/124 |
| 2013/0139154 A1* | 5/2013 | Shah | G06F 9/45558 718/1 |
| 2013/0139155 A1* | 5/2013 | Shah | G06F 9/45558 718/1 |
| 2013/0152083 A1* | 6/2013 | Miki | G06F 9/5077 718/1 |
| 2013/0159650 A1* | 6/2013 | Wakamiya | G06F 3/065 711/162 |
| 2013/0179879 A1* | 7/2013 | Zhang | G06F 9/45533 718/1 |
| 2013/0227551 A1* | 8/2013 | Tsirkin | G06F 9/45558 718/1 |
| 2013/0238802 A1* | 9/2013 | Sarikaya | H04L 29/08153 709/226 |
| 2013/0247056 A1* | 9/2013 | Hattori | G06F 9/5077 718/102 |
| 2013/0263118 A1* | 10/2013 | Kannan | G06F 9/45558 718/1 |
| 2013/0275592 A1* | 10/2013 | Xu | H04L 45/14 709/225 |
| 2013/0282354 A1 | 10/2013 | Sayers et al. | |
| 2013/0283265 A1* | 10/2013 | Acharya | G06F 9/45558 718/1 |
| 2013/0297769 A1* | 11/2013 | Chang | G06F 9/45558 709/224 |
| 2013/0318528 A1* | 11/2013 | Hirose | G06F 9/455 718/1 |
| 2013/0325433 A1* | 12/2013 | Albano | G06F 9/45558 703/21 |
| 2013/0326175 A1* | 12/2013 | Tsirkin | G06F 9/45558 711/162 |
| 2013/0339956 A1* | 12/2013 | Murase | G06F 9/505 718/1 |
| 2013/0346987 A1* | 12/2013 | Raney | G06F 9/5044 718/102 |
| 2014/0006358 A1 | 1/2014 | Wang et al. | |
| 2014/0013306 A1 | 1/2014 | Gounares et al. | |
| 2014/0047272 A1 | 2/2014 | Breternitz et al. | |
| 2014/0067940 A1 | 3/2014 | Li et al. | |
| 2014/0068335 A1 | 3/2014 | Bromley et al. | |
| 2014/0108001 A1 | 4/2014 | Brown et al. | |
| 2014/0109051 A1* | 4/2014 | McDonald | G06F 8/30 717/124 |
| 2014/0223431 A1* | 8/2014 | Yoshimura | G06F 9/45558 718/1 |
| 2014/0289418 A1* | 9/2014 | Cohen | G06F 11/3688 709/226 |
| 2014/0317625 A1* | 10/2014 | Ichikawa | G06F 9/5077 718/1 |
| 2014/0378057 A1 | 12/2014 | Ramon et al. | |
| 2015/0007174 A1* | 1/2015 | Jain | G06F 9/45533 718/1 |
| 2015/0046141 A1 | 2/2015 | Lahiri et al. | |
| 2015/0100958 A1* | 4/2015 | Banavalikar | G06F 9/45558 718/1 |
| 2015/0120797 A1 | 4/2015 | Roy et al. | |
| 2015/0135178 A1* | 5/2015 | Fischer | H04L 67/10 718/1 |
| 2015/0140956 A1 | 5/2015 | Prewitt, II et al. | |
| 2015/0293826 A1 | 10/2015 | Sincan et al. | |
| 2016/0034289 A1* | 2/2016 | Amano | G06F 11/30 718/1 |
| 2016/0034372 A1 | 2/2016 | Panda et al. | |

OTHER PUBLICATIONS

Haikun Liu et al., Live Migration of Virtual Machine Based on Full System Trace and Replay, Jun. 11-13, 2009, [Retrieved on May 25, 2017]. Retrieved from the internet: <URL: http://d1.acm.org/citation.cfm?id=1551630> 8 Pages (101-110).*

Notification of Transmittal of the International Search Report and the Written Opinion of the International Searching Authority, or the Declaration for PCT International Application No. PCT/US2014/031637 (Jul. 31, 2014).

Commonly-assigned, co-pending International Patent Application No. PCT/US2014/045658 for "Methods, Systems, and Computer Readable Media for Modeling a Workload," (Unpublished, filed Jul. 8, 2014).

"IxLoad: Specifications," https://web.archive.org/web/20130901094417/http://ixiacom.com/products/network_test/applications/ixload/specifications/index.php, pp. 1-5 (Sep. 1, 2013).

Commonly-assigned, co-pending U.S. Appl. No. 13/969,085 for "Methods, Systems, and Computer Readable Media for Modeling a Workload," (Unpublished, filed Aug. 16, 2013).

"IxLoad" Ixia, Solution Brief, pp. 1-4 (Feb. 2012).

Notification of Transmittal of the International Search Report and the Written Opnion of the International Searching Authority, or the Declaration for PCT International Application No. PCT/US2014/045658 (Oct. 30, 2014).

Notice of Allowance and Fee(s) Due for U.S. Appl. No. 14/251,547 (Aug. 23, 2016).

Notice of Allowance and Fee(s) Due for U.S. Appl. No. 13/969,085 (Aug. 10, 2016).

Notice of Allowance and Fee(s) Due for U.S. Appl. No. 14/749,606 (Jul. 27, 2016).

Applicant-Initiated Interview Summary for U.S. Appl. No. 13/969,085 (Jun. 7, 2016).

Communication of European publication number and information on the application of Article 67(3) EPC for European Application No. 14836839.2 (May 25, 2016).

Notice of Allowance and Fees(s) Due for U.S. Appl. No. 14/445,921 (May 12, 2016).

Final Office Action for U.S. Appl. No. 13/969,085 (Apr. 19, 2016).

Non-Final Office Action for U.S. Appl. No. 14/251,547 (Apr. 26, 2016).

Applicant-Initiated Interview Summary for U.S. Appl. No. 14/445,921 (Apr. 14, 2016).

Corrected Notice of Allowability for U.S. Appl. No. 14/158,659 (Jan. 11, 2016).

Notice of Allowance and Fee(s) Due for U.S. Appl. No. 14/158,659 (Dec. 11, 2015).

Non-Final Office Action for U.S. Appl. No. 14/445,921 (Jan. 14, 2016).

Non-Final Office Action for U.S. Appl. No. 13/969,085 (Sep. 24, 2015).

Commonly-assigned, co-pending U.S. Appl. No. 14/749,606 for "Methods, Systems, and Computer Readable Media for Emulating Computer Processing Usage Patterns on a Virtual Machine," (Unpublished, filed Jun. 24, 2015).

"IxVM: Validating Virtualized Assets and Environments," Ixia, Data Sheet, pp. 1-8 (Jun. 2015).

"Fisher-Yates Shuffle," http://en.wikipedia.org/wiki/Fisher-Yates_shuffle, pp. 1-11, (May 8, 2014).

"ImpairNetTM—EIM1G4S, EIM10G4S, and EIM40G2Q Ethernet Impairment Load Module," pp. 1-5, (Jul. 2013).

Communication of the extended European search report for European Patent Application No. 14774774.5 (Nov. 23, 2016).

Communication of European publication number and information on the application of Article 67(3) DPC for European Application No. 14774774.5 (Jan. 7, 2016).

* cited by examiner

| VM ID | VM NAME | IP ADD | MAC ADD | HYPERVISOR ID | HYPERVISOR OS | MEMORY SIZE | SUPPORTED PROTOCOLS | APPLICATIONS/ SERVICES | VM STATE | VM OS | VM/APP INFO | ADDITIONAL INFO |
|---|---|---|---|---|---|---|---|---|---|---|---|---|
| 134535 | XR-2 | 172.16.254.1 | 01-23-45-67-89-AB | HYPE-2 | VMWare 5.5 | 4 GB | XML, RPC, HTTP, IP, SOAP | WEB SERVER | RUNNING | LINUX | INTERFACE | DATA TO STORE |
| 256454 | YC-4 | 189.126.253.3 | 01-23-45-67-89-AB-CD-EF | HYPER-1 | VMWare 5.1 | 1 GB | XML, RPC, HTTP, IP, SOAP | WEB CLIENT | ERROR | WIN 8 | PORT INFO | DATA TO REQUEST |
| 389793 | ZM-6 | 189.126.258.3 | 00-14-22-01-23-45 | HYPER-2 | KVM | 500 MB | | WEB CLIENT | STOPPED | WIN 7 | INTERFACE | TIME STOPPED |
| 423432 | RU-8 | 2207:f0c1:1002:0051 | 00-40-96-01-23-45 | HYPER-2 | Xen | 2 GB | XML, RPC, HTTP, IP, SOAP | MAIL SERVER | INITIALIZING | LINUX | PORT INFO | EMAIL MESSAGES |
| 534598 | MQ-10 | 189.126.254.3, 1201:b0c1:3002:0037 | 00-14-22-01-23-45-A3-12 | HYPER-1 | Xen | 6 GB | XML, RPC, HTTP, IP, SOAP | WEB CLIENT, WEB SERVER | MOVING | OS X | PORT INFO | NEW LOCATION INFO |

000
METHODS, SYSTEMS, AND COMPUTER READABLE MEDIA FOR EMULATING VIRTUALIZATION RESOURCES

PRIORITY CLAIM

This application claims the benefit of U.S. Provisional Patent Application No. 61/805,915, filed Mar. 27, 2013; the disclosure of which is incorporated herein by reference in its entirety.

TECHNICAL FIELD

The subject matter described herein relates to testing devices. More specifically, the subject matter relates to methods, systems, and computer readable media for emulating virtualization resources.

BACKGROUND

A data center is a facility used to house computer systems and associated components (e.g., storage systems). Data centers typically provide high reliability and security and typically include resources shared by multiple clients of the data center operator. Large data centers are industrial scale operations using as much electricity as a small town. Various data centers may utilize virtualization. For example, a data center may implement multiple virtual machines (VMs), e.g., virtual servers, using a physical server or node in the data center. In this example, each VM may execute an operating system and other software, where each VM may appear as a physical server to end users.

Generally, when one or more VMs are implemented on a physical server, a hypervisor is used to manage and facilitate the VMs. For example, a hypervisor can emulate various hardware features available to the VMs. In this example, software (e.g., an operating system) executing on the VM may have access to hardware, such as video, keyboard, storage, and/or network interfaces, emulated by the hypervisor. The hypervisor may also segregate the VMs from each other such that an operation within one VM is kept within that VM and is not visible to or modifiable from another VM.

When testing data center equipment, it is important to make sure that testing mimics real world scenarios and conditions. For example, when testing a data center server, it may be necessary to mimic or emulate resources in the data center. However, conventional testing of such equipment requires manufacturers to use the same scale of equipment that is found in a data center, which can require substantial resources, e.g., tens of millions of dollars or more and a significant amount of time to configure such equipment.

Accordingly, in light of these difficulties, a need exists for methods, systems, and computer readable media for emulating virtualization resources.

SUMMARY

Methods, systems, and computer readable media for emulating virtualization resources are disclosed. According to one method, the method occurs at a computing platform. The method includes receiving a message associated with a device under test (DUT) and in response to receiving the message, performing an action associated with at least one of an emulated hypervisor and an emulated virtual machine (VM).

According to one system, the system includes a computing platform. The computing platform includes at least one processor and memory. The computing platform is configured to receive a message associated with a DUT and to perform, in response to receiving the message, an action associated with at least one of an emulated hypervisor and an emulated VM.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the terms "device under test", "device(s) under test", or "DUT" refer to one or more devices, systems, communications networks, and/or computing platforms for communicating or interacting with testing equipment or related software.

BRIEF DESCRIPTION OF THE DRAWINGS

The subject matter described herein will now be explained with reference to the accompanying drawings of which:

FIG. 3 is a diagram illustrating exemplary state information for emulating virtualization resources according to an embodiment of the subject matter described herein.

DETAILED DESCRIPTION

Figure 1:
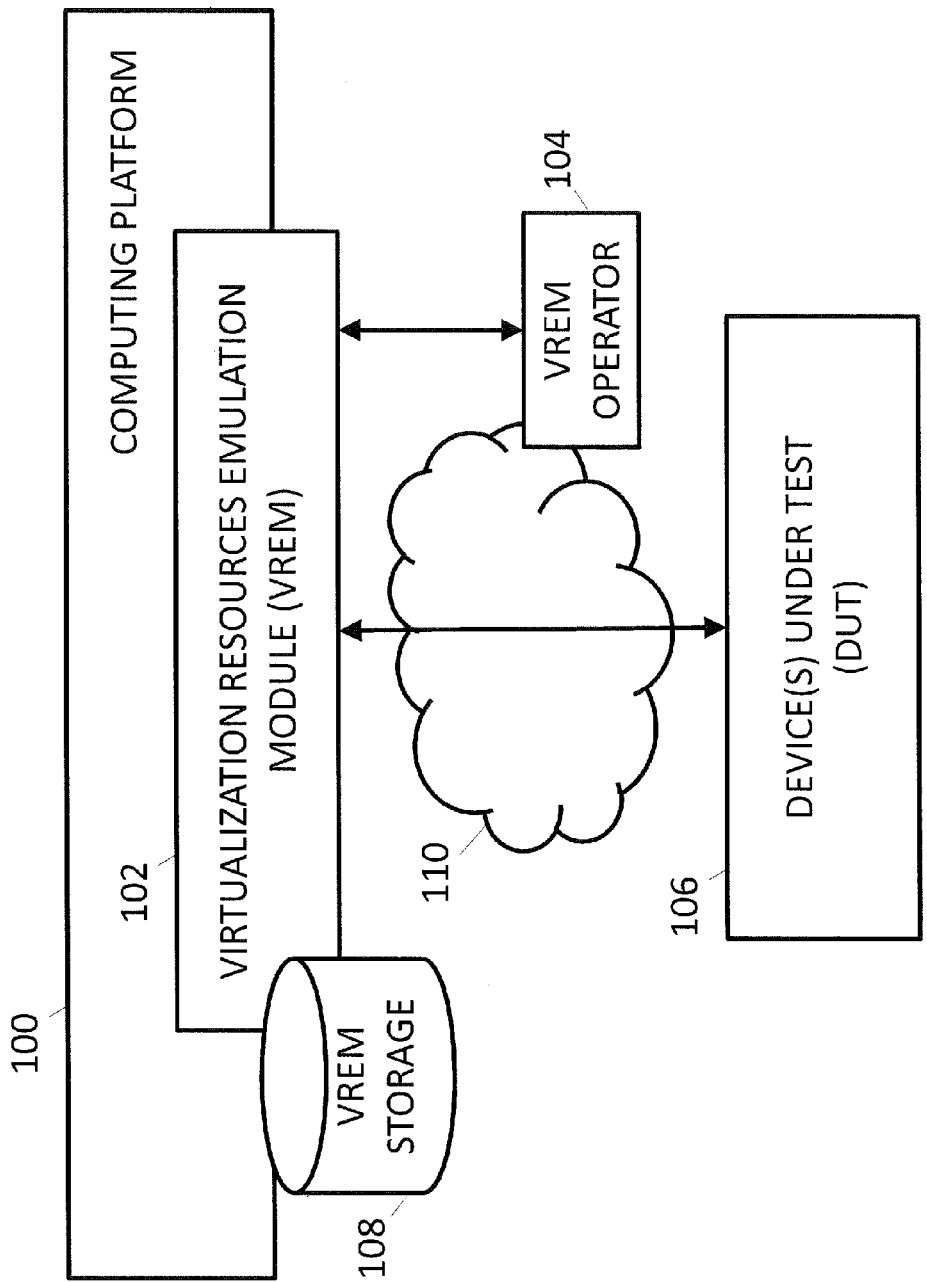
FIG. 1 is a diagram illustrating an exemplary computing platform for emulating virtualization resources according to an embodiment of the subject matter described herein.

The subject matter described herein includes methods, systems, and computer readable media for emulating virtualization resources. When testing one or more network resources, it may be desirable to test the resources under non-trivial load conditions that mirror or closely approximate real world scenarios.

In accordance with some aspects of the subject matter described herein, a computing platform (e.g., a testing platform, device, or a node executing a single operating system (OS) and utilizing no hypervisor or virtualization software) may be configured to emulate virtualization resources, such as hypervisors and/or virtual machines (VMs), virtual networking resources, and/or data center related resources. For example, a computing platform in accordance with the present disclosure may be configured to maintain state information associated with at least one or more hypervisors and/or one or more VMs. In this example, a hypervisor controller or other control entity may send a request message for creating a new VM to the computing platform. Instead of creating a real VM, the computing platform may update a table (e.g., a VM state table) containing entries representing emulated VMs in an emulated hypervisor and related state information. By maintaining state information using a table or another data structure, the computing platform may provide response messages or perform other actions indicating that a VM has been created (even though no actual VM has been created). Hence, a computing platform in accordance with the present disclosure can test hypervisor controllers and/or other entities by responding and/or acting like real hypervisors and/or VMs. Further, such a computing platform may be able to simulate or emulate traffic of an entire data-center rack utilizing significantly less resources than conventional testing systems, e.g., a 40 times reduction in size, power, and operating cost from the amounts used when testing with a non-emulated data center rack.

In accordance with some aspects of the subject matter described herein, a computing platform may be configured to test virtualization resources (e.g., data center related resources) and virtualization related configurations (e.g., data center related configurations). For example, an exemplary computing platform described herein may utilize a system architecture capable of emulating both hypervisor (e.g., VM management) functionality and associated VM functionality.

In accordance with some aspects of the subject matter described herein, a computing platform may be configured to efficiently test virtualization related configurations by monitoring and/or analyzing various device(s) under test (DUT) associated with one or more emulated resources. For example, an exemplary computing platform described herein may be configured to emulate data center or resources therein. The emulated data center may be comprised of multiple pods and each pod may be comprised of multiple servers. Each server may be configured with multiple VMs, where the VMs on each server are managed by a hypervisor. Each VM may use a different "guest" OS. Each VM may host and/or execute multiple software applications. In this example, the exemplary computing platform may generate realistic workloads (e.g., packet generation and/or packet processing) involving one or more emulated resources and may perform meaningful and comprehensive testing of one or more DUT, e.g., a network router, a network switch, a hypervisor controller, a network controller, and/or associated data centers or related systems.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an exemplary computing platform 100 for emulating virtualization resources according to an embodiment of the subject matter described herein. Computing platform 100 may represent any suitable entity or entities (e.g., a testing platform or multiple computing platforms) for emulating various virtualization related resources, such as one or more servers, hypervisors, virtual machines, virtual routers, virtual switches, and/or other "cloud" or data center related resources. For example, computing platform 100 may emulate one or more racks of servers. In this example, each emulated server may include an emulated hypervisor managing a first emulated virtual machine running Windows Server OS and a second emulated virtual machine running Mac OS X. Continuing with this example, computing platform 100 may be emulating these resources using a Linux based OS, memory, and one or more modules (e.g., software executing on one or more processors).

In some embodiments, computing platform 100 may be configured to perform one or more aspects associated with testing one or more DUT 106. In some embodiments, computing platform 100 may be a stand-alone tool, a testing device, or software executing on a processor or across multiple processors. In some embodiments, computing platform 100 may be a single node or may be distributed across multiple computing platforms or nodes.

Computing platform 100 may include a virtualization resources emulation module (VREM) 102. VREM 102 may be any suitable entity (e.g., software executing on a processor or across multiple processors) for performing one or more aspects associated with emulating virtualization related resources, such as hypervisors, virtual machines, and/or other virtualization hardware or software, including protocols, services, and/or applications associated with the emulated resources.

In some embodiments, VREM 102 may be configured to emulate a data center and/or resources therein. For example, VREM 102 may be configured as a cloud simulator and/or emulator module and may use a single server with a single OS and no hypervisor to emulate a plurality of hypervisors, where each emulated hypervisor appears to be executing one or more VMs.

In some embodiments, VREM 102 may be implemented using a non-emulated or actual VM or may be configured to use a non-emulated or actual VM. For example, VREM 102 may include software executing "on" a single non-emulated VM associated with computing platform 100. In this example, VREM 102 may be configured to emulate hundreds or thousands of hypervisors and millions of VMs.

In some embodiments, VREM 102 may any include functionality for receiving and responding to network requests from a hypervisor controller (e.g., DUT 106) to perform various actions. Exemplary actions may include creating a VM, powering up a VM, and/or powering down a VM. Instead of creating real VMs, VREM 102 may just update a state information data structure (e.g., a VM state table) containing VMs in each hypervisor and their state related information. VREM 102 may then provide responses indicating that a VM has been created (even though no actual VM has been created) and/or performing other appropriate actions, thereby appearing like actual virtualization resources (e.g., a "real" hypervisor).

In some embodiments, VREM 102 may include functionality for emulating network interfaces, network traffic, protocols, and/or applications of VMs associated with a hypervisor. VREM 102 may perform such emulation by using maintained state information associated with each VM. For example, if a simulated VM is indicated to be in a powered on & running state by a state information data structure (e.g., a VM state table), VREM 102 or a related entity may respond to a network request, such as an Internet control message protocol (ICMP) request (e.g., a PING request) message, with a relevant response message, such as an ICMP response message. In this example, if the VM is not in a running state (e.g., as indicated by the VM state table), no response message may be provided, e.g., no ICMP response may be sent. In another example, in a similar way to ICMP or PING messages, VREM 102 may emulate other applications, routing protocols, and/or devices using maintained state information associated with one or more emulated resources.

In some embodiments, VREM 102 may include functionality for migrating, also referred to herein as teleporting or moving, a VM from one resource to another resource (e.g., between hypervisors). For example, VREM 102 may be capable of performing VM migrations or movements regardless of the operational status of a VM. In this example, VREM 102 may migrate or move a "live" or "online" VM between hypervisors and/or may migrate or move a "stopped" or "offline" VM between hypervisors.

In some embodiments, VREM 102 may respond to a hypervisor controller commands requesting teleportation and may update state information in a VM state table. VREM 102 may send synthetic network traffic from a first interface associated with a first emulated hypervisor containing the teleportation source VM to a second interface associated with a second emulated hypervisor containing the teleportation target VM. The synthetic network traffic may be representative of traffic that occurs during an actual or non-emulated VM teleportation. The VM state table entries may be updated to indicate that the VM is on the new hypervisor. In this example, VREM 102 may facilitate stopping and/or discarding any traffic coming to and/or from the VM via the first interface and VREM 102 may facilitate starting or allowing traffic coming to and/or from the VM via the second interface.

In some embodiments, VREM 102 may include functionality for emulating "overlay tunnels" between DUT 106 and one or more emulated resources and/or between emulated resources. Exemplary overlay tunnels may use encapsulation, security, encryption, and/or tunneling for providing or facilitating communications among emulated resources (e.g., VMs and hypervisors) and/or DUT 106. For example, VREM 102 may implement or emulate an overlay tunnel connecting an emulated VM and DUT 106 (e.g., a network switch and/or a hypervisor controller) by adding, removing processing, and/or modifying header information to one or more packets associated with the emulated VM. In another example, VREM 102 may implement or emulate an overlay tunnel connecting two emulated VMs and/or other emulated resources.

In some embodiments, VREM 102 may include one or more communications interfaces and related functionality for interacting with users and/or nodes. For example, VREM 102 may provide a communications interface for communicating with VREM user 104. In some embodiments, VREM user 104 may be an automated system or may be controlled or controllable by a human user.

In some embodiments, VREM user 104 may select and/or configure various aspects associated with emulating virtualization and/or testing of DUT 106. For example, various user interfaces (e.g., an application user interface (API) and graphical user interface (GUI)) may be provided for generating workloads and/or configuring one or more actions or scenarios to be tested, monitored, or performed. Exemplary user interfaces for testing DUT 106 and/or performing emulation may support automation (e.g., via one or more scripting languages), a representation state transfer (REST) API, a command line, and/or a web based GUI.

In some embodiments, VREM 102 may include one or more communications interfaces and related functionality for interacting with DUT 106. DUT 106 may be any suitable entity or entities (e.g., devices, systems, or platforms) for communicating with, accessing, or otherwise using emulated virtualization resources. For example, DUT 106 may include a router, a network switch, a hypervisor controller, a data center manager, or a network controller. In another example, DUT 106 may include one or more systems and/or computing platforms, e.g., a data center or a group of servers and/or routers. In yet another example, DUT 106 may include one or more networks or related components, e.g., an access network, a core network, or the Internet.

In some embodiments, DUT 106 may communicate with one or more emulated virtualization resources, such as an emulated hypervisor, using one or more protocols. For example, VREM 102 may be configured to receive, process, and/or send messages in various protocols associated with emulated hypervisor. In this example, VREM 102 may be configured to send such messages via an overlay or encapsulation (e.g., using Internet protocol security (IPsec)) tunnel via network 110 to DUT 106.

VREM 102 may include or access VREM storage 108. VREM storage 108 may be any suitable entity or entities for maintaining or storing information related to emulated virtualization resources. For example, VREM 102 may access VREM storage 108 containing state information about a hypervisor, a virtual machine, a virtual switch, a virtual router and/or services or applications associated with virtualization resources. VREM storage 108 may include non-transitory computer readable media, such as flash memory, random access memory, or other storage devices. In some embodiments, VREM storage 108 may be external to and/or or integrated with computer platform 100 and/or VREM 102. In some embodiments, VREM storage 108 may be located at a single node or distributed across multiple platforms or devices.

Network 110 may be any suitable entity or entities for facilitating communications between various nodes and/or modules, e.g., in a test environment. For example, network 110 may be an access network, a mobile network, the Internet, or another network for communicating with one or more data centers, DUT 106, VM user 104, VREM 102, and/or computing platform 100. In some embodiments, DUT 106, VM user 104, VREM 102, and/or computing platform 100 may be located in network 110 or another location.

It will be appreciated that FIG. 1 is for illustrative purposes and that various nodes and/or modules, their locations, and/or their functions described above in relation to FIG. 1 may be changed, altered, added, or removed.

Figure 2:
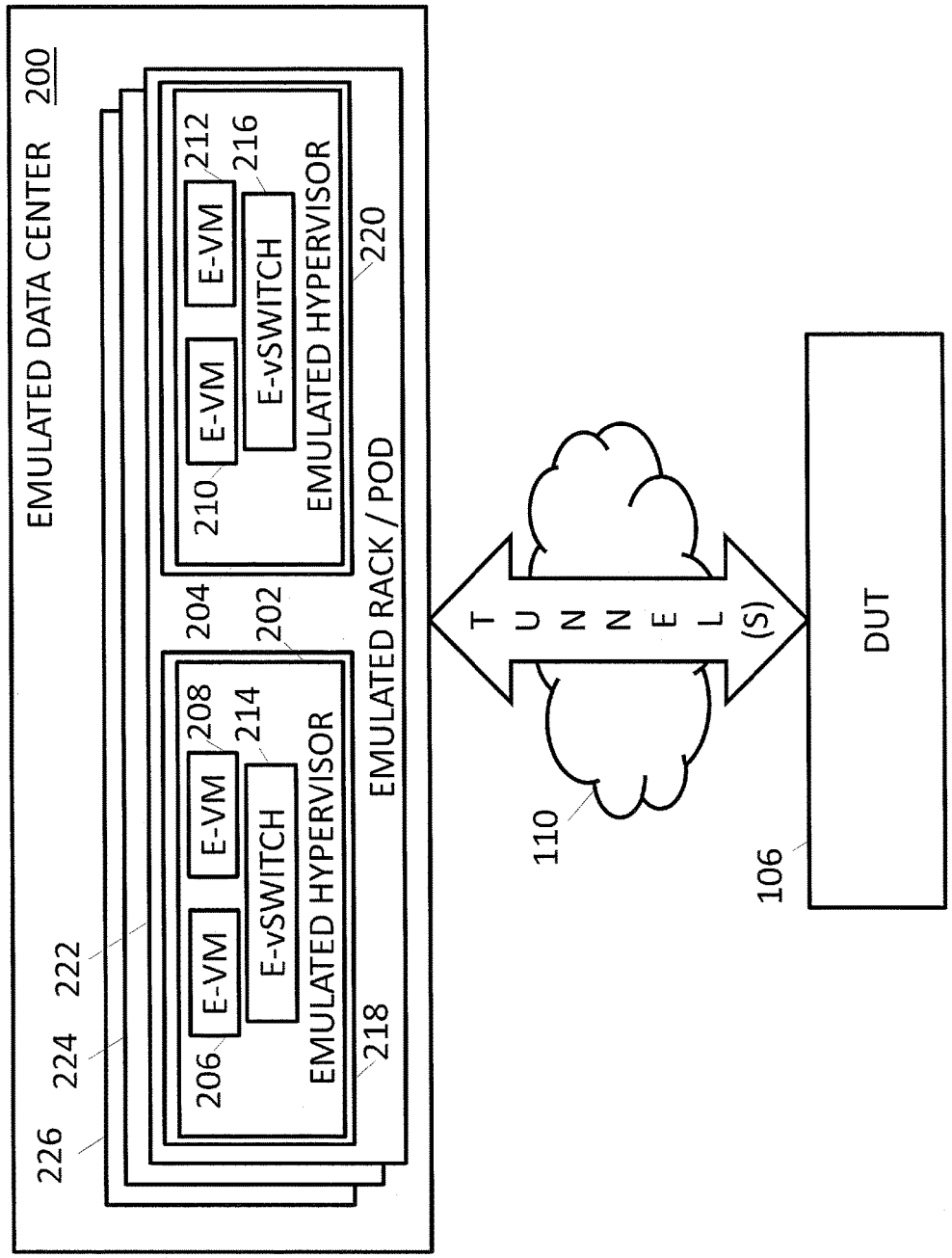
FIG. 2 is a diagram illustrating exemplary emulated virtualization resources according to an embodiment of the subject matter described herein.

FIG. 2 is a diagram illustrating exemplary emulated virtualization resources according to an embodiment of the subject matter described herein. In some embodiments, computing platform and/or VREM 102 may be configured to emulate a data center or one or more related resources. A conventional data center is comprised of multiple racks or frames of computing resources, including servers. It is common practice for data center providers to implement these computing resources in a "virtualized" manner. As such, a data center computing equipment rack may be comprised of multiple shelves, where each shelf is adapted to accept and support multiple server blades or server boxes. Each server may incorporate a Hypervisor that is adapted to host multiple VMs. In some embodiments, racks or frames within a data center may be logically grouped into one or more pods. Multiple routing and/or switching modules may also be hierarchically associated with these data center resources. For example, a "top of rack" router may be incorporated into each frame or rack of equipment. One or more intra-pod routers may be associated with all racks within a given logical server pod. One or more inter-pod routers may be associated with pods residing in the same physical data center. Further, one or more data center-level routers may be associated with and facilitate communication among different data center sites. In some embodiments, DUT 106 may include one or more routers or switches mentioned above, e.g., a data center router, a "top of rack" router, an intra-pod router, and/or inter-pod router.

Referring to FIG. 2, computing platform 100 (e.g., a cloud simulator/emulator platform) and/or VREM 102 (e.g., a cloud simulator/emulator module) may be configured to provide, implement, use, and/or execute software for operating an emulated data center 200. Emulated data center 200 may be any suitable entity (e.g., software executing on a processor or functionality provided by VREM 102) for emulating a data center or resources and/or applications therein. For example, as depicted in FIG. 3, emulated data center 200 may include or be associated with emulated racks/pods 222-226. Emulated rack/pod 222 may include or be associated with emulated servers 218-220. Emulated server 218 may include or be associated with an emulated hypervisor 202. Emulated server 220 may include or be associated with an emulated hypervisor 204. Emulated hypervisor 202 may include or be associated with emulated VMs (E-VMs) 206 and 208. Emulated hypervisor 204 may include or be associated with E-VMs 210 and 212. Emulated hypervisor 202 may also include or be associated with an emulated virtual switch (E-vSwitch) 214. Emulated hypervisor 204 may also include or be associated with an emulated virtual switch (E-vSwitch) 216.

In some embodiments, emulated data center 200 may be configured or adapted to generate test packet traffic for testing DUT 106. For example, DUT 106 may be one or more routers and/or switches located in a live deployment or test environment (e.g., a federated data center or server farm) and emulated data center 200 may generate traffic that traverses DUT 106 thereby testing performance of DUT 106 as the DUT 106 routes or switches the generated packets and other related traffic (e.g., packets from other entities). In another example, test traffic may be used to test non-emulated (e.g., real) resources, e.g., physical servers within a local data center or a remote data center.

In some embodiments, emulated data center 200 may be configured or adapted to emulate and/or simulate migrating or moving one or more E-VMs between emulated servers and/or emulated hypervisors, and to monitor and/or analyze DUT performance in response to such migrations. For example, a request message for moving E-VM 212 from emulated hypervisor 204 to emulated hypervisor 202 may be sent from an hypervisor controller to VREM 102 and, in response to receiving the request message, VREM 102 may emulate the movement of E-VM 212 by updating maintained state information associated with E-VM 212 to indicate the migration and by sending appropriate response messages indicating E-VM 212 has been moved. In this example, VREM 102 may be configured to generate appropriate response messages that include header information and other information such that packets sent from E-VM 212 appear to originate from emulated hypervisor 202 instead of emulated hypervisor 204.

In some embodiments, emulated data center 200 may be configured or adapted to support one or more protocols for receiving or sending traffic associated with various emulated resources. Exemplary protocols may include a virtual extensible LAN (VXLAN) protocol, an OpenFlow protocol, a virtual network tag (VN-Tag) protocol, an open vSwitch database management (OVSDB) protocol, a border gateway protocol (BGP), a BGP link-state (BGP-LS) protocol, a network configuration (NETCONF) protocol interface, and/or a simple network management protocol (SNMP) interface. For example, VREM 102 may generate and/or process traffic associated with E-VMs 206-212. In this example, exemplary VM related protocols or interfaces may be associated with one or more applications or services "executing" on EVMs 206-212, such as Internet control message protocol (ICMP) for sending or receiving a ping command or an L23 interface for receiving an L23 data stream.

In some embodiments, emulated data center 200 and/or related emulated resources and/or applications may be configured or adapted to generate stateful packet traffic, stateless packet traffic, and/or a combination of stateful and stateless packet traffic and may generate packet traffic associated with a control plane and/or a user plane.

In some embodiments, emulated data center 200 may be configured or adapted to support one or more tunneling protocols and may receive and/or send tunneled traffic. For example, VREM 102 may implement or emulate an overlay tunnel connecting an E-VM 208 and DUT 106 via network 110 by adding, removing processing, and/or modifying header information to one or more packets associated with E-VM 208, e.g., packets transmitted from or to computing platform 100 and/or VREM 102. In another example, VREM 102 may implement or emulate an overlay tunnel connecting E-VM 208 and E-VM 212 and/or other emulated resources. In this example, the overlay tunnel may be implemented using encapsulation techniques, security protocols, and/or other tunneling technologies. Exemplary tunneling technologies may include a NVGRE protocol, a VXLAN protocol, an IPSec protocol, and/or another protocol.

In some embodiments, emulated data center 200 may be configured or adapted to emulate and/or simulate various network (e.g., wide area network (WAN) or local area network (LAN)) environments. For example, VREM 102 may generate packet traffic that appears to be affected by one or more network impairments and/or may include or exhibit certain characteristics. Exemplary characteristics or impairments may be associated with latency, jitter, packet loss, packet misdirection, congestion, and/or other factors.

In some embodiments, emulated data center 200 may be configured or adapted to emulate various OSs, protocols, and/or applications for different emulated resources. For example, emulated hypervisors 202-204 may be associated with various brands of VM managers, such as VMware, KVM, Xen, and/or HyperV. In another example, E-VMs 206-212 may be associated with one or more "guest" OSs, such as Windows 7, Windows 8, Linux or a variant, UNIX or a variant, and/or a MAC OS.

In some embodiments, emulated data center 200 may be configured or adapted to perform various actions associated with one or more emulated resources. For example, packets sent to or from emulated data center 200 may be delayed and/or modified such that the packets appear to interact with E-vSwitch 214 associated with E-VM 208. In this example, such packets may include header data (e.g., in VN-Tag header) that indicates a particular virtual port or interface associated with E-VM 208.

In some embodiments, emulated data center 200 may be configured to perform actions based on scripts (e.g., user-configured actions or preconfigured workloads), historical data (e.g., previously executed tests), and/or dynamic or static (e.g., preconfigured) environment conditions. For example, at an initial testing period, emulated data center 200 may be configured to provide emulation for up to 60 E-VMs and up to 50 emulated hypervisors. During testing of DUT 106, emulated data center 200 may indicate failures of one or more resources, e.g., rack/pod 222 or emulated server 218. DUT 106 may be monitored (e.g., by VREM 102 or computing platform 100) to determine when and/or whether failures are detected and, if any mitigation actions are taken, when the mitigation action (e.g., migrating VMs to other non-affected resources) are initiated by DUT 106. In another example, where DUT 106 includes a network switch or router, emulated data center 200 may be configured to execute a script of scheduled VM events. The VM events may include performing migrations of one or more VMs to different resources and DUT 106 may be monitored to determine when and/or whether DUT 106 sends packets (e.g., subsequent to a migration operation) are addressed correctly and/or whether the packets reach the new location (e.g., the interface or port associated with the migrated-to resource).

It will be appreciated that FIG. 2 is for illustrative purposes and that emulated data center 200 and resources therein may be changed, altered, added, or removed.

FIG. 3 is a diagram illustrating exemplary state information 300 for emulating virtualization resources according to an embodiment of the subject matter described herein. In some embodiments, state information 300 may be accessed and/or stored by computing platform 100 and/or VREM 102 using various data structures.

Referring to FIG. 3, state information 300 may be depicted using a table representing associations between VM identifiers (IDs) and state information associated with VMs or related entities. The state information table of FIG. 3 may include any information for emulating virtualization resources, such as operational status and related information associated with an emulated hypervisor (e.g., emulated hypervisor 202) and/or an E-VM (e.g., E-VM 206). In some embodiments, state information 300 may be stored or maintained in VREM storage 308 and may be usable for emulating various resources and/or for performing one or more actions associated with an emulated resource, e.g., providing appropriate response messages to DUT 106.

In some embodiments, state information 300 may include one or more identifiers and/or related information. Exemplary VM identifiers may include a VM ID, a VM name, one or more Internet protocol (IP) addresses, and/or one or more media access control (MAC) addresses. For example, a VM ID, a VM Name, an IP address, and/or a MAC address may be usable to uniquely identify an E-VM. In another example, an IP address and/or a MAC address associated with an E-VM may be usable for a VM ID and/or a VM name.

In some embodiments, state information 300 may include information associated with one or more E-VMs 206-212. For example, state information 300 associated with one or more E-VMs 206-212 may include information about VM identifiers, related hypervisors, related virtual networking resources (e.g., a virtual switch or a virtual router), a memory size or other configurations associated with the E-VM, a VM state or operational status, a VM OS (e.g., Linux, Windows 7, Windows 8, Mac OS X, etc.), information about applications, protocols, interfaces, ports, and/or services associated with the E-VM, and/or other information.

In some embodiments, state information 300 may include information about resources (e.g., emulated and non-emulated resources) other than an E-VM, e.g., hypervisors, virtual networking resources, racks, pods, and/or related physical resources (e.g., a processor performing emulation and/or a physical port or physical interface associated with a virtual resource). For example, state information 300 may be maintained for an emulated hypervisor. In this example, the emulated hypervisor may include information about a hypervisor ID, a hypervisor OS (e.g., VMware, KVM, Xen, etc.), a hypervisor state or operational status, information about VMs, applications, protocols, interfaces, ports, and/or services associated with the emulated hypervisor, and/or other information.

It will be appreciated that state information 300 in FIG. 3 is for illustrative purposes and that different and/or additional information may also be usable for emulating one or more virtualization resources. Further, it will be appreciated that state information 300 may be stored in various data structures and/or in one or more locations.

Figure 4:
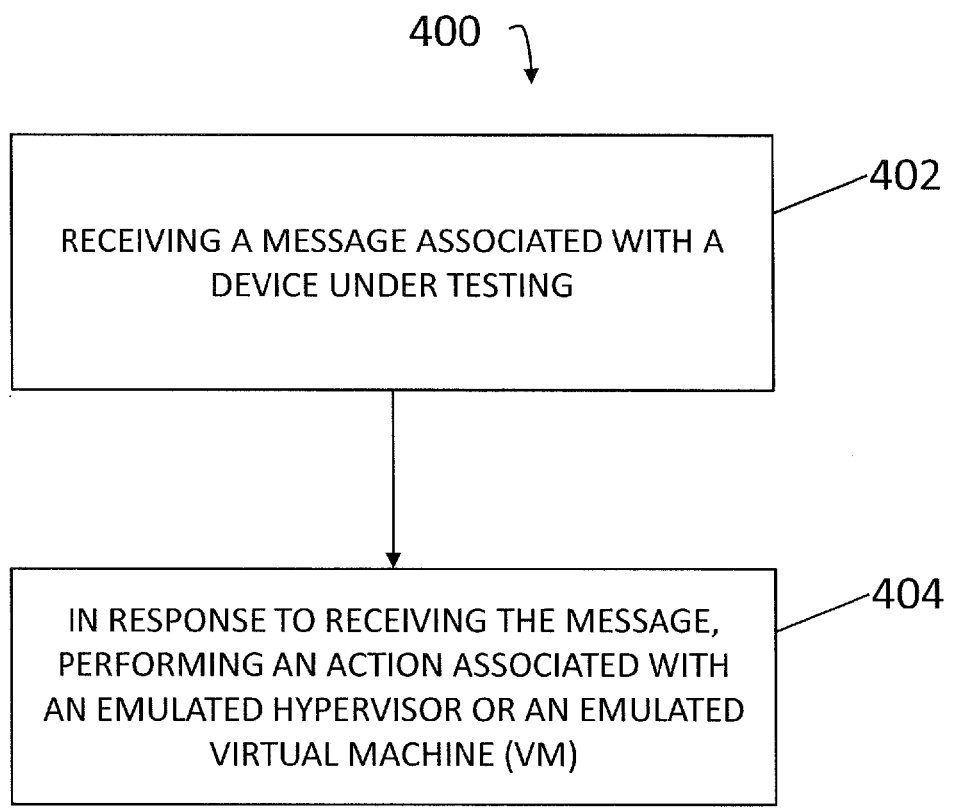
FIG. 4 is a diagram illustrating an exemplary process for emulating virtualization resources according to an embodiment of the subject matter described herein.

FIG. 4 is a diagram illustrating an exemplary process for emulating virtualization resources according to an embodiment of the subject matter described herein. In some embodiments, exemplary process 400, or portions thereof, may be performed by or at computing platform 100 (e.g., a network equipment test device, a cloud simulator/emulator platform), VREM 102 (e.g., a cloud simulator/emulator module), and/or another node or module.

At step 402, a message may be received that is associated with DUT 106. For example, a request message may be sent from a hypervisor controller for creating a VM, powering up a VM, powering down a VM, or moving a VM (e.g., from one hypervisor or physical server to another hypervisor or physical server).

In some embodiments, a message may be received for moving an E-VM from a first emulated hypervisor to a second emulated hypervisor. For example, a request message may be for moving E-VM 212 from emulated hypervisor 204 to emulated hypervisor 202.

In some embodiments, DUT 106 may include a router, a network switch, a hypervisor controller, a data center manager, or a network controller.

At step 404, in response to receiving the message, an action associated with an emulated hypervisor or an emulated virtual machine (VM) may be performed. For example, in response to receiving, from DUT 106, a request message for stopping E-VM 206, VREM 102 may be configured to update an entry of state information 300 (e.g., stored in VREM storage 108) to indicate that E-VM 206 is stopped or powered down. In this example, VREM 102 may send a response message to DUT 106, where the response message indicates that E-VM 206 has powered down or stopped.

In some embodiments, performing an action associated with an emulated hypervisor or an E-VM may include sending a response message, monitoring performance of DUT 106, creating the E-VM, powering up the E-VM, powering down the E-VM, modifying state information associated with the emulated hypervisor or the E-VM, deleting state information associated with the emulated hypervisor or the E-VM, adding state information associated with the emulated hypervisor or the E-VM, emulating a communications protocol associated with the DUT, emulating traffic associated with the emulated hypervisor or the E-VM, emulating a virtual networking component, and/or instantiating a virtual networking component.

In some embodiments, moving or transporting an E-VM from a first emulated hypervisor to a second emulated hypervisor may include updating state information associated with the E-VM (e.g., in a data structure maintained by computing platform 100 or VREM 102) to indicate that the E-VM is moving to the second emulated hypervisor, sending at least one message for moving the E-VM from a first interface associated with the first emulated hypervisor to a second interface associated with the second emulated hypervisor, updating the state information associated with the E-VM to indicate that the E-VM is associated with the second emulated hypervisor, and stopping traffic associated with the E-VM sent via the first interface.

In some embodiments, computing platform 100 or a related module (e.g., VREM 102) may be configured to emulate network interfaces, network traffic, protocols, applications executing on the E-VM, and/or applications executing on the emulated hypervisor.

In some embodiments, computing platform 100 or a related module (e.g., VREM 102) may be configured to emulate or implement an overlay tunnel associated with an emulated hypervisor and/or other emulated resource. For example, VREM 102 may implement or emulate an overlay tunnel connecting an E-VM 208 and DUT 106 by adding or modifying header information to one or more packets transmitted from or to computing platform 100. In another example, VREM 102 may implement or emulate an overlay tunnel connecting an E-VM 208 and E-VM 206.

In some embodiments, computing platform 100 or a related module (e.g., VREM 102) may be configured to maintain state information associated with an E-VM or an emulated hypervisor in a data structure such that the computing platform is capable of responding to messages or requests with appropriate state information.

In some embodiments, state information associated with an E-VM or an emulated hypervisor may include information about the E-VM, information about a current emulated hypervisor associated with the E-VM, information about a previous emulated hypervisor associated with the E-VM, information about an emulated application executing on the E-VM, information about an emulated protocol associated with the E-VM, information about an emulated OS associated with the E-VM, information about an operating status associated with the E-VM, information about the emulated hypervisor, information about a plurality of E-VMs associated with the emulated hypervisor, information about an emulated application executing on the emulated hypervisor, information about an emulated protocol associated with the emulated hypervisor, information about an emulated OS associated with the emulated hypervisor, and/or information about an operating status associated with the emulated hypervisor.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for emulating virtualization resources, the method comprising:
   at a computing platform configured to emulate a hypervisor by responding to hypervisor directed messages, wherein the emulated hypervisor lacks functionality for executing VMs:
   receiving a message from a device under test (DUT) for creating a virtual machine (VM);
   in response to receiving the message, performing an action associated with the emulated hypervisor or an emulated VM, wherein performing the action associated with the emulated hypervisor or the emulated VM includes emulating the VM by creating an entry in a VM state data structure for representing emulated VMs associated with the emulated hypervisor, wherein the entry includes a VM identifier, a VM operating system identifier, a hypervisor identifier, and state information indicating that the VM has been created, and responding to the message using the state information indicating that the VM has been created, wherein the emulated VM is a non-executing data representation of the VM, wherein the computing platform uses or modifies the entry in the VM state data structure when responding to a subsequent message directed to the emulated VM.

2. The method of claim 1 wherein performing the action includes sending a response message, monitoring performance of the DUT, creating the emulated VM, powering up the emulated VM, powering down the emulated VM, modifying state information associated with the emulated hypervisor or the emulated VM, deleting state information associated with the emulated hypervisor or the emulated VM, adding state information associated with the emulated hypervisor or the emulated VM, emulating a communications protocol associated with the DUT, emulating traffic associated with the emulated hypervisor or the emulated VM, emulating a virtual networking component or instantiating a virtual networking component.

3. The method of claim 1 wherein the computing platform is configured to emulate network interfaces, network traffic, protocols, applications executing on the emulated VM, or applications executing on the emulated hypervisor.

4. The method of claim 1 wherein the computing platform is configured to emulate an overlay tunnel associated with the emulated hypervisor and to add header information associated with the overlay tunnel to one or more packets transmitted from or to the computing platform.

5. The method of claim 1 wherein the DUT includes a router, a network switch, a hypervisor controller, a data center manager, or a network controller.

6. The method of claim 1 wherein the message is for moving or migrating the emulated VM from the emulated hypervisor to a second emulated hypervisor.

7. The method of claim 6 wherein performing the action includes:
   updating state information associated with the emulated VM in a data structure maintained by the computing platform to indicate that the emulated VM is moving to the second emulated hypervisor,
   sending at least one message for moving the emulated VM from a first interface associated with the emulated hypervisor to a second interface associated with the second emulated hypervisor,
   updating the state information associated with the emulated VM to indicate that the emulated VM is associated with the second emulated hypervisor, and
   stopping traffic associated with the emulated VM sent via the first interface associated with the emulated hypervisor.

8. The method of claim 1 wherein the computing platform is configured to maintain state information associated with the emulated VM or the emulated hypervisor in a data structure such that the computing platform is capable of responding to the messages with appropriate state information.

9. The method of claim 1 wherein the state information associated with the emulated VM or the emulated hypervisor includes information about the emulated VM, information about the emulated hypervisor associated with the emulated VM, information about a previous emulated hypervisor associated with the emulated VM, information about an emulated application executing on the emulated VM, information about an emulated protocol associated with the emulated VM, information about an emulated operating system associated with the emulated VM, information about an operating status associated with the emulated VM, information about the emulated hypervisor, information about a plurality of emulated VMs associated with the emulated hypervisor, information about an emulated application executing on the emulated hypervisor, information about an emulated protocol associated with the emulated hypervisor, information about an emulated operating system associated with the emulated hypervisor, or information about an operating status associated with the emulated hypervisor.

10. A system for emulating virtualization resources, the system comprising:
   a computing platform comprising:
      at least one processor; and
      a memory, wherein the computing platform is configured to emulate a hypervisor by responding to hypervisor directed messages, wherein the emulated hypervisor lacks functionality for executing VMs, wherein the computing platform is configured to receive a message from a device under test (DUT) for creating a virtual machine (VM) and to perform, in response to receiving the message, an action associated with at least one of the emulated hypervisor and an emulated VM, wherein performing the action associated with the emulated hypervisor or the emulated VM includes emulating the VM by creating an entry in a VM state data structure for representing emulated VMs associated with the emulated hypervisor, wherein the entry includes a VM identifier, a VM operating system identifier, a hypervisor identifier, and state information indicating that the VM has been created, and responding to the message using the state information indicating that the VM has been created, wherein the emulated VM is a non-executing data representation of the VM, wherein the computing platform uses or modifies the entry in the VM state data structure when responding to a subsequent message directed to the emulated VM.

11. The system of claim 10 wherein the computing platform is configured to send a response message, monitoring performance of the DUT, create the emulated VM, power up the emulated VM, power down the emulated VM, modify state information associated with the emulated hypervisor or the emulated VM, delete state information associated with the emulated hypervisor or the emulated VM, add state information associated with the emulated hypervisor or the emulated VM, emulate a communications protocol associated with the DUT, emulate traffic associated with the emulated hypervisor or the emulated VM, emulate a virtual networking component, or instantiate a virtual networking component.

12. The system of claim 10 wherein the computing platform is configured to emulate network interfaces, network traffic, protocols, applications executing on the emulated VM, or applications executing on the emulated hypervisor.

13. The system of claim 10 wherein the computing platform is configured to emulate an overlay tunnel associated with the emulated hypervisor.

14. The system of claim 13 wherein the computing platform is configured to add header information associated with the overlay tunnel to one or more packets transmitted from or to the computing platform.

15. The system of claim 10 wherein the DUT includes a router, a network switch, a hypervisor controller, a data center manager, or a network controller.

16. The system of claim 10 wherein the message is for moving or migrating the emulated VM from the emulated hypervisor to a second emulated hypervisor.

17. The system of claim 16 wherein the computing platform is configured to performing the action by:
   updating state information associated with the emulated VM in a data structure maintained by the computing platform to indicate that the emulated VM is moving to the second emulated hypervisor,
   sending at least one message for moving the emulated VM from a first interface associated with the emulated hypervisor to a second interface associated with the second emulated hypervisor,
   updating the state information associated with the emulated VM to indicate that the emulated VM is associated with the second emulated hypervisor, and
   stopping traffic associated with the emulated VM sent via the first interface associated with the emulated hypervisor.

18. The system of claim 10 wherein the computing platform is configured to maintain state information associated with the emulated VM or the emulated hypervisor in a data structure such that the computing platform is capable of responding to the messages with appropriate state information.

19. The system of claim 10 wherein the state information associated with the emulated VM or the emulated hypervisor includes information about the emulated VM, information about the emulated hypervisor associated with the emulated VM, information about a previous emulated hypervisor associated with the emulated VM information about an emulated application executing on the emulated VM, information about an emulated protocol associated with the emulated VM, information about an emulated operating system associated with the emulated VM, information about an operating status associated with the emulated VM, information about the emulated hypervisor, information about a plurality of emulated VMs associated with the emulated hypervisor, information about an emulated application executing on the emulated hypervisor, information about an emulated protocol associated with the hypervisor, information about an emulated operating system associated with the emulated hypervisor, or information about an operating status associated with the emulated hypervisor.

20. A non-transitory computer readable medium comprising computer executable instructions embodied in the non-transitory computer readable medium that when executed by a processor of a computer perform steps comprising:
   at a computing platform configured to emulate a hypervisor by responding to hypervisor directed messages, wherein the emulated hypervisor lacks functionality for executing VMs:
   receiving a message from a device under test (DUT) for creating a virtual machine (VM);
   in response to receiving the message, performing an action associated with the emulated hypervisor or an emulated VM, wherein performing the action associated with the emulated hypervisor or the emulated VM includes emulating the VM by creating an entry in a VM state data structure for representing emulated VMs associated with the emulated hypervisor, wherein the entry includes a VM identifier, a VM operating system identifier, a hypervisor identifier, and state information indicating that the VM has been created, and responding to the message using the state information indicating that the VM has been created, wherein the emulated VM is a non-executing data representation of the VM, wherein the computing platform uses or modifies the entry in the VM state data structure when responding to a subsequent message directed to the emulated VM.

\* \* \* \* \*